United States Patent [19]
Rumreich et al.

[11] Patent Number: 6,055,023
[45] Date of Patent: *Apr. 25, 2000

[54] TELEVISION APPARATUS FOR SIMULTANEOUS DECODING OF AUXILIARY DATA INCLUDED IN MULTIPLE TELEVISION SIGNALS

[75] Inventors: Mark Francis Rumreich, Indianapolis; Kenneth Wayne Maze, Mooresville; Joseph Wayne Forler, Indianapolis, all of Ind.

[73] Assignee: Thomson Consumer Electronics, Indianapolis, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 08/769,329

[22] Filed: Dec. 19, 1996

[51] Int. Cl.[7] .............................. H04N 5/44; H04N 5/45; H04N 5/445
[52] U.S. Cl. ........................................... 348/553; 348/564
[58] Field of Search ................................ 348/553, 554, 348/563, 564, 565, 568, 468, 486, 484, 589, 588, 598, 606; H04N 5/445, 5/45, 5/44

[56] References Cited

U.S. PATENT DOCUMENTS

| | | | |
|---|---|---|---|
| 5,091,785 | 2/1992 | Canfield et al. | 358/183 |
| 5,111,296 | 5/1992 | Duffield | 358/83 |
| 5,194,954 | 3/1993 | Duffield et al. | 358/193.1 |
| 5,428,400 | 6/1995 | Landis et al. | 348/569 |
| 5,500,680 | 3/1996 | Lee . | |
| 5,557,338 | 9/1996 | Maze et al. | 348/564 |
| 5,617,146 | 4/1997 | Duffield et al. | 348/460 |
| 5,621,473 | 4/1997 | Hill | 348/559 |
| 5,671,019 | 9/1997 | Isoe et al. | 348/565 |
| 5,708,475 | 1/1998 | Hayashi et al. | 348/468 |
| 5,748,255 | 5/1998 | Johnson et al. | 348/553 |
| 5,790,204 | 8/1998 | Yamaguchi | 348/564 |
| 5,978,046 | 11/1999 | Shintani | 348/589 |
| 5,995,160 | 11/1999 | Rumreich | 348/564 |

FOREIGN PATENT DOCUMENTS

| | | | |
|---|---|---|---|
| 0489387 | 6/1992 | European Pat. Off. | H04N 7/087 |
| 0536828 | 4/1993 | European Pat. Off. | H04N 7/087 |

OTHER PUBLICATIONS

PCT International Search Report dated Mar. 19, 1998.

*Primary Examiner*—Howard Britton
*Assistant Examiner*—Tung Vo
*Attorney, Agent, or Firm*—Joseph S. Tripoli; Peter M. Emanuel; David T. Shoneman

[57] ABSTRACT

Television apparatus includes first and second auxiliary data decoders for simultaneously extracting auxiliary data from respective first and second television signals to produce first and second auxiliary data. The data decoders can selectably extract data from one or more auxiliary data intervals, e.g., one or more line intervals during vertical blanking within a television signal. The first and second auxiliary data is coupled to a controller such as the main microprocessor of the television system. The second auxiliary data is coupled to the controller via an auxiliary data buffer and an I²C serial data bus. The television signal from which the second auxiliary data is extracted can be provided by a second television signal source such as a second tuner or an external signal source (e.g., video cassette recorder, video disk player, and the like).

14 Claims, 3 Drawing Sheets

TELEVISION APPARATUS FOR SIMULTANEOUS DECODING OF AUXILIARY DATA INCLUDED IN MULTIPLE TELEVISION SIGNALS

CROSS-REFERENCE TO RELATED APPLICATIONS

This application is related to the following commonly-assigned U.S. patent applications: Ser. No. 770,770 (Attorney Docket No. RCA 88,200) entitled "METHOD AND APPARATUS FOR POSITIONING AUXILIARY INFORMATION PROXIMATE AN AUXILIARY IMAGE IN A MULTI-IMAGE DISPLAY", Ser. No. 769,333 (Attorney Docket No. RCA 88,461) entitled "VIDEO SIGNAL PROCESSING SYSTEM PROVIDING INDEPENDENT IMAGE MODIFICATION IN A MULTI-IMAGE DISPLAY", Ser. No. 769,331 (Attorney Docket No. RCA 88,489) entitled "METHOD AND APPARATUS FOR PROVIDING A MODULATED SCROLL RATE FOR TEXT DISPLAY", and Ser. No. 769,332 (Attorney Docket No. RCA 88,490) entitled "METHOD AND APPARATUS FOR REFORMATTING AUXILIARY INFORMATION INCLUDED IN A TELEVISION SIGNAL", all of which were filed in the name of Mark F. Rumreich et al. on the same date as the present application.

FIELD OF THE INVENTION

The invention generally relates to television apparatus that process auxiliary data and, more particularly, to television signal receivers that perform simultaneous, multi-channel decoding of auxiliary data.

BACKGROUND

A television signal may include auxiliary information in addition to video and audio program information. For example, data pertaining to digital data services such as closed captioning (CC), EXtended Data Services (XDS), and StarSight® may be included in National Television Standards Committee (NTSC) television signal in the United States. The digital data for such services is encoded in various portions of the vertical blanking interval (VBI) of an NTSC television signal.

Specifically, closed captioning data is encoded in the vertical blanking interval of line 21 of a television signal. Each line 21 vertical blanking interval that includes captioning data has two bytes of data encoded in the latter half of the line interval. The data is processed to produce text representing the audio content of a television program in a portion of the television display. Although captioning was originally developed to aid the hearing impaired, captioning also provides benefits to non-hearing impaired users. For example, by enabling both captioning and audio muting, a user can visually enjoy both the video and the audio program portions of a television program without disturbing others. United States law requires closed caption decoders in all television receivers having displays larger than 13 inches (FCC Report & Order, FCC 91–119). As a result, most video programming (including video tape) now includes captioning data.

EXtended Data Services (XDS) data is encoded in the same format as closed captioning data and shares line 21 of field 1 with the closed captioning data, i.e., each video frame contains two fields of video information denoted as field 1 and field 2. As specified in ANSI/EIA 608, XDS data provides information such as program rating/content (e.g., can be used to provide the so-called V-Chip function for restricting television viewing based on program content), program description, program title, program start time, elapsed time, network name, station identification and future program information.

StarSight® data provides information similar to XDS and is encoded in the same format. However, StarSight® data provides information regarding all channels rather than just the present channel. In addition, StarSight® data can be included in the VBI of one or more of lines 10 to 18. StarSight® data is decoded to produce a program guide display similar to program guides provided in print media. Because StarSight® data includes data for all channels, receiving StarSight® data for a complete program guide display can require up to six hours.

A decoder is required for extracting any of the foregoing types of auxiliary data. One component of the decoder is a data slicer that converts the analog television signal into digital data during the auxiliary data interval. Because closed captioning, EXtended Data Services and StarSight® all use similar data encoding formats, one data decoder could be shared for recovering data for all three data types. However, the data decoder in a conventional television receiver is hardwired to the main video source for decoding captioning and XDS information pertaining to the main video source.

Hardwiring the data decoder to the main video source limits the flexibility of the decoder. For example, auxiliary information that is associated with an auxiliary image in a multi-image display cannot be decoded. One specific example is a picture-in-picture (PIP) system in which auxiliary information associated with the small picture (pix) that is inset into the main picture cannot be decoded. Another example is a picture-outside-picture (POP) system. As a result, caption information for the auxiliary image cannot be displayed. Also, XDS-related features, such as restricting what can be displayed based on program content (, i.e., V-chip control), cannot be implemented for the small picture. In addition, because auxiliary data such as StarSight® data may be present on a channel other than that being viewed via the main picture source, hardwiring an auxiliary data decoder to the main signal source may preclude accumulating StarSight® data during normal viewing.

An approach to improving the flexibility of the decoder is to allow video sources other than main video to be coupled to the input of the data decoder, e.g., by adding a selector switch. Adding a second tuner further improves the flexibility of the auxiliary data recovery system. As an example, certain television receivers produced by Sharp, e.g., models 31HX1200 and 35HX1200, include two tuners and a data decoder with an input selector switch. These receivers support viewing captions for either the main picture or the small picture.

SUMMARY OF THE INVENTION

The invention resides, in part, in the inventors' recognition that problems exist with known approaches for processing auxiliary data in television receivers having the capability to produce a multi-image display such as a picture-in-picture display. More specifically, although the above-described arrangement of a second tuner and a selector switch at the input of an auxiliary data decoder improves the flexibility of the auxiliary data decoder, it is not possible to simultaneously view captions associated with the main picture and captions associated with the small picture. Also, simultaneous monitoring of the program content, (i.e., V-Chip content advisory feature), of the main and small picture signals is not possible. In addition, StarSight® data cannot be accumulated while watching a program with captioning or content advisory features active.

The invention also resides, in part, in providing an auxiliary data decoding system that solves the described problems. The system comprises a pair of auxiliary data decoders (primary and secondary data decoders) for simultaneously extracting auxiliary data from a plurality of television signals carrying auxiliary data. The secondary data decoder can selectably extract data from one or more auxiliary data intervals, e.g., multiple line intervals during vertical blanking within a television signal. The first and second auxiliary data is coupled to a control processor such as the main microprocessor of the television system. The second auxiliary data is coupled to the control processor via an auxiliary data buffer and a serial data bus (e.g., a conventional I²C bus). The television signal from which the second auxiliary data is extracted can be provided by a second television signal source such as a secondary tuner or an external signal source (e.g., video cassette recorder, video disk player, and the like).

BRIEF DESCRIPTION OF THE DRAWING

The system described below may be better understood by referring to the drawing, in which.

To facilitate understanding, identical reference numerals have been used, where possible, to designate identical elements that are common to the figures.

DETAILED DESCRIPTION

Figure 1:
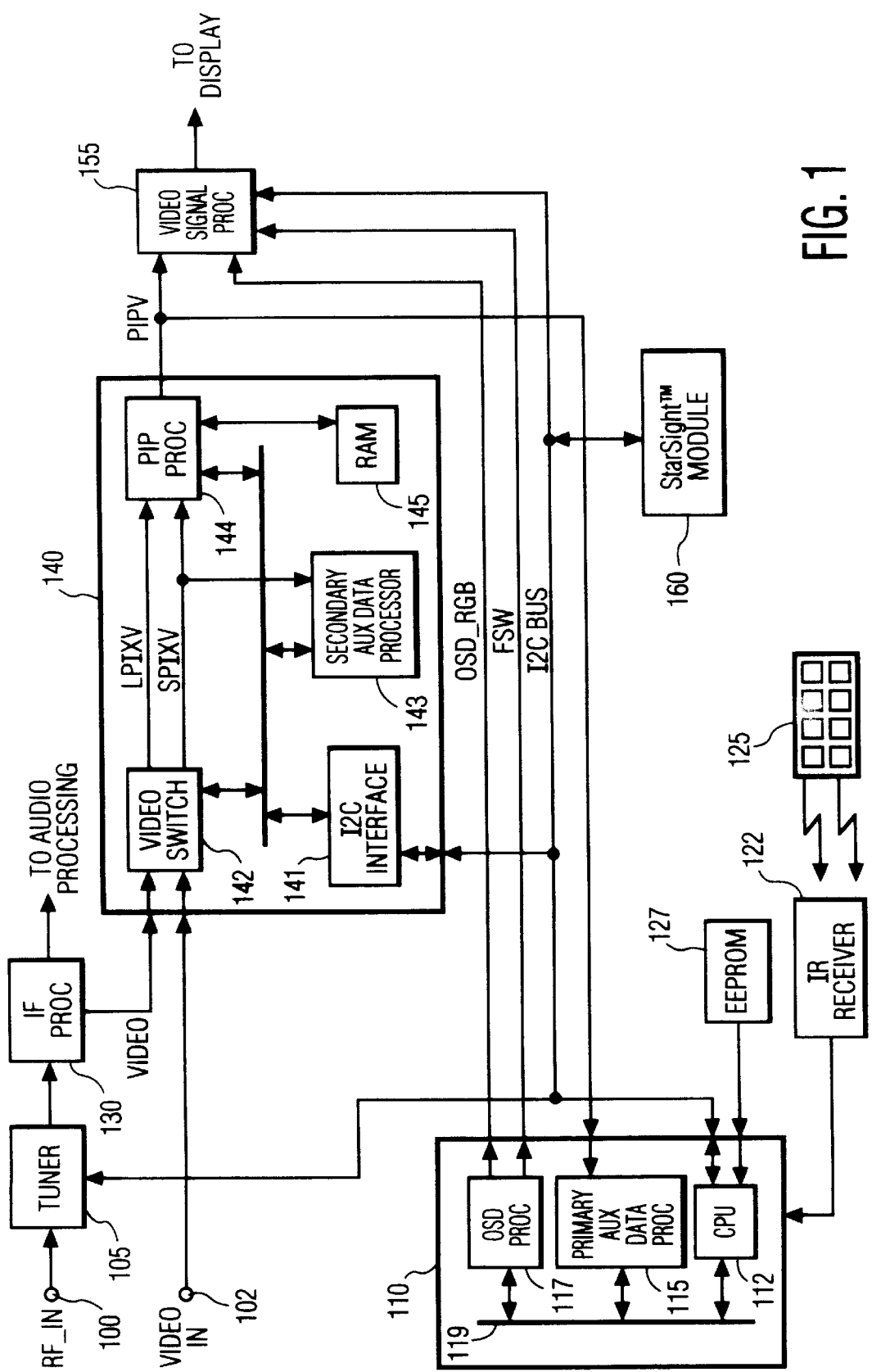
FIG. 1 depicts a block diagram of a television signal receiver incorporating the present invention.

The television receiver shown in FIG. 1 has a first input 100 for receiving television signal RF_IN at RF frequencies and a second input 102 for receiving baseband television signal VIDEO IN. Signal RF_IN may be supplied from a source such as an antenna or cable system while signal VIDEO IN may be supplied, for example, by a video cassette recorder (VCR). Tuner 105 and IF processor 130 operate in a conventional manner for tuning and demodulating a particular television signal that is included in signal RF_IN. IF processor 130 produces baseband video signal VIDEO representing the video program portion of the tuned television signal. IF processor 130 also produces a baseband audio signal that is coupled to an audio processing section (not shown in FIG. 1) for further audio processing. Although FIG. 1 shows input 102 as a baseband signal, the television receiver could include a second tuner and IF processor similar to units 105 and 130 for producing a second baseband video signal from either signal RF_IN or from a second RF signal source.

The system shown in FIG. 1 also includes a main microprocessor (μP) 110 for controlling components of the television receiver such as tuner 105, picture-in-picture processing unit 140, video signal processor 155, and StarSight® data processing module 160. As used herein, the term "microprocessor" represents various devices including, but not limited to, microprocessors, microcomputers, microcontrollers and controllers. Microprocessor 110 controls the system by sending and receiving both commands and data via serial data bus I²C BUS which utilizes the well-known I²C serial data bus protocol. More specifically, central processing unit (CPU) 112 within μP 110 executes control programs contained within memory, such as EEPROM 127 shown in FIG. 1, in response to commands provided by a user, e.g., via IR remote control 125 and IR receiver 122. For example, activation of a "CHANNEL UP" feature on remote control 125 causes CPU 112 to send a "change channel" command along with channel data to tuner 105 via I²C BUS. As a result, tuner 105 tunes the next channel in the channel scan list.

CPU 112 controls functions included within μP 110 via bus 119 within μP 110. In particular, CPU 112 controls primary auxiliary data processor 115 and on-screen display (OSD) processor 117. Auxiliary data processor 115 extracts auxiliary data such as closed caption data, StarSight® data, and XDS data, including V-chip data, from a television signal. OSD processor 117 operates in a conventional manner to produce R, G, and B video signals OSD_RGB that, when coupled to a display device, will produce a displayed image representing on-screen display information such as graphics and/or text. OSD processor 117 also produces control signal FSW which is intended to control a fast switch for inserting signals OSD_RGB into the system's video output signal at times when an on-screen display is to be displayed. For example, when a user enables closed captioning, e.g., by activating a particular switch on remote control 125, CPU 112 enables processors 115 and 117 so that processor 115 extracts the closed caption data from line 21 intervals of video signal PIPV. Processor 117 produces signals OSD_RGB representing the closed caption data. Processor 117 also produces signal FSW indicating when the caption is to be displayed.

CPU 112 also controls auxiliary data decoder 115 for extracting StarSight® data. StarSight® data is typically received only on a particular television channel and the television receiver must tune that channel to extract StarSight® data. To prevent StarSight® data extraction from interfering with normal use of the television receiver, CPU 112 initiates StarSight® data extraction by tuning the particular channel only during a time period when the television receiver is usually not in use (e.g., 2:00 AM). At that time, CPU 112 configures decoder 115 such that auxiliary data is extracted from horizontal line intervals such as line 16 that are used for StarSight® data. CPU 112 controls the transfer of extracted StarSight® data from decoder 115 via I²C BUS to StarSight® module 160. A processor internal to the module formats and stores the data in memory within the module. In response to the StarSight® program guide display being activated (e.g., a user activating a particular key on remote control 125), CPU 112 transfers formatted StarSight® program guide display data from StarSight® module 160 via I²C BUS to OSD processor 117 which generates the graphics and text signals needed to produce the StarSight® program guide display.

When V-chip data processing is enabled, e.g., by a user selecting a particular rating limit via remote control 125, CPU 112 configures auxiliary data processor 115 for extracting XDS data and, in particular, V-chip data. CPU 112 continually monitors the received V-chip data to determine the content (e.g., rating, program title, program category, etc.) of television programming included in the television signal. As a specific example, CPU 112 monitors the received V-chip data and compares received programming information to a user-selected rating limit. If the rating of a particular program or scene is unacceptable, CPU 112 sends a control signal via I²C BUS to PIP unit 140, and in particular PIP processor 144, which modifies the displayed image as described in U.S patent application Ser. No. 769,333 (Attorney Docket No. RCA 88,461) entitled "VIDEO SIGNAL PROCESSING SYSTEM PROVIDING INDEPENDENT IMAGE MODIFICATION IN A MULTI_IMAGE DISPLAY" which was filed in the name of Mark F. Rumreich on the same date as the present application, is commonly assigned, and is hereby incorporated by reference. V-chip related modification of the image may include blanking the image until the received rating data indicates that the received program (or scene) has an acceptable rating. In addition to image blanking, CPU 112 may cause OSD processor 117 to generate signals OSD_RGB representing a text message that will be displayed on the blanked screen indicating, for example, the reason for and expected duration of the image modification.

Video signal processor (VSP) 155 performs conventional video signal processing functions, such as luma and chroma processing. Output signals produced by VSP 155 are suitable for coupling to a display device, e.g., a kinescope or LCD device (not shown in FIG. 1), for producing a displayed image. VSP 155 also includes a fast switch for coupling signals produced by OSD processor 117 to the output video signal path at times when graphics and/or text is to be included in the displayed image. The fast switch is controlled by control signal FSW which is generated by OSD processor 117 in main microprocessor 110 at times when text and/or graphics are to be displayed.

The input signal for VSP 155 is signal PIPV that is output by picture-in-picture (PIP) unit 140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. The described operation of PIP unit 140 is provided by features of PIP unit 140 including video switch 142, I²C interface 141, PIP processor 144 and RAM 145. Switch 142 operates under user control for determining the coupling of the two input video signals VIDEO and VIDEO IN to the large and small pix signals LPIXV and SPIXV within PIP unit 140. Typically, switch 142 couples signal VIDEO to signal LPIXV and couples signal VIDEO IN to signal SPIXV, but switch 142 can swap the connections or couple one input signal to both the large and small picture signal lines. I²C interface 141 provides a bi-directional control and data interface between the I²C BUS and the functions within PIP unit 140. Thus, main μP 110 can control the operation of switch 142 and PIP processor 144 via the I²C BUS.

When PIP processing is activated, PIP processor 144 implements the PIP function in a conventional manner. Briefly, PIP processor 144 converts signal SPIXV to digital data via analog-to-digital converters (ADC) that are included in PIP processor 144. The digital data is subsampled to reduce the amount of data and to reduce the size of the small picture image that is displayed. The subsampled data is stored in RAM 145 until the small picture display interval at which time the stored small-picture data is read from RAM 145 and converted into an analog small picture signal via digital-to-analog converters (DAC) that are included in PIP processor 144. A switch included in PIP processor 144 includes the analog small picture signal in signal PIPV during the small picture display interval.

An exemplary embodiment of the features of the system shown in FIG. 1 that have been described thus far comprises an ST9296 microprocessor produced by SGS-Thomson Microelectronics for providing the features associated with μP 110; an M65616 picture-in-picture processor produced by Mitsubishi for providing the described basic PIP functionality associated with PIP processor 140; and an LA7612 video signal processor produced by Sanyo for providing the functions of VSP 155. In accordance with aspects of the invention, PIP unit 140 in FIG. 1 also includes secondary auxiliary data processor (or decoder) 143. As explained in detail below, decoder 143 decodes auxiliary data included in the small pix signal, i.e. in signal SPIXV. Data decoded from signal SPIXV, such as V-chip, closed caption, or StarSight® data, is buffered and transferred to μP 110 via I²C BUS for subsequent processing under control of CPU 112. In addition to the features of processor 143 relating to extraction and buffering of auxiliary data that are described below, decoder 143 also provides features that facilitate displaying closed caption data associated with the small picture signal, i.e., PIP captioning. Features of the system shown in FIG. 1 that relate in particular to PIP captioning are described in detail in the following U.S. patent applications: Ser. No. 770,770 (Attorney Docket No. RCA 88,200) entitled "METHOD AND APPARATUS FOR POSITIONING AUXILIARY INFORMATION PROXIMATE AN AUXILIARY IMAGE IN A MULTI-IMAGE DISPLAY", Ser. No. 769,331 (Attorney Docket No. RCA 88,489) entitled "METHOD AND APPARATUS FOR PROVIDING A MODULATED SCROLL RATE FOR TEXT DISPLAY", and Ser. No. 769,332 (Attorney Docket No. RCA 88,490) entitled "METHOD AND APPARATUS FOR REFORMATTING AUXILIARY INFORMATION INCLUDED IN A TELEVISION SIGNAL", all of which were filed in the name of Mark F. Rumreich et al. on the same date as the present application, are commonly assigned, and are incorporated herein by reference.

Figure 2:
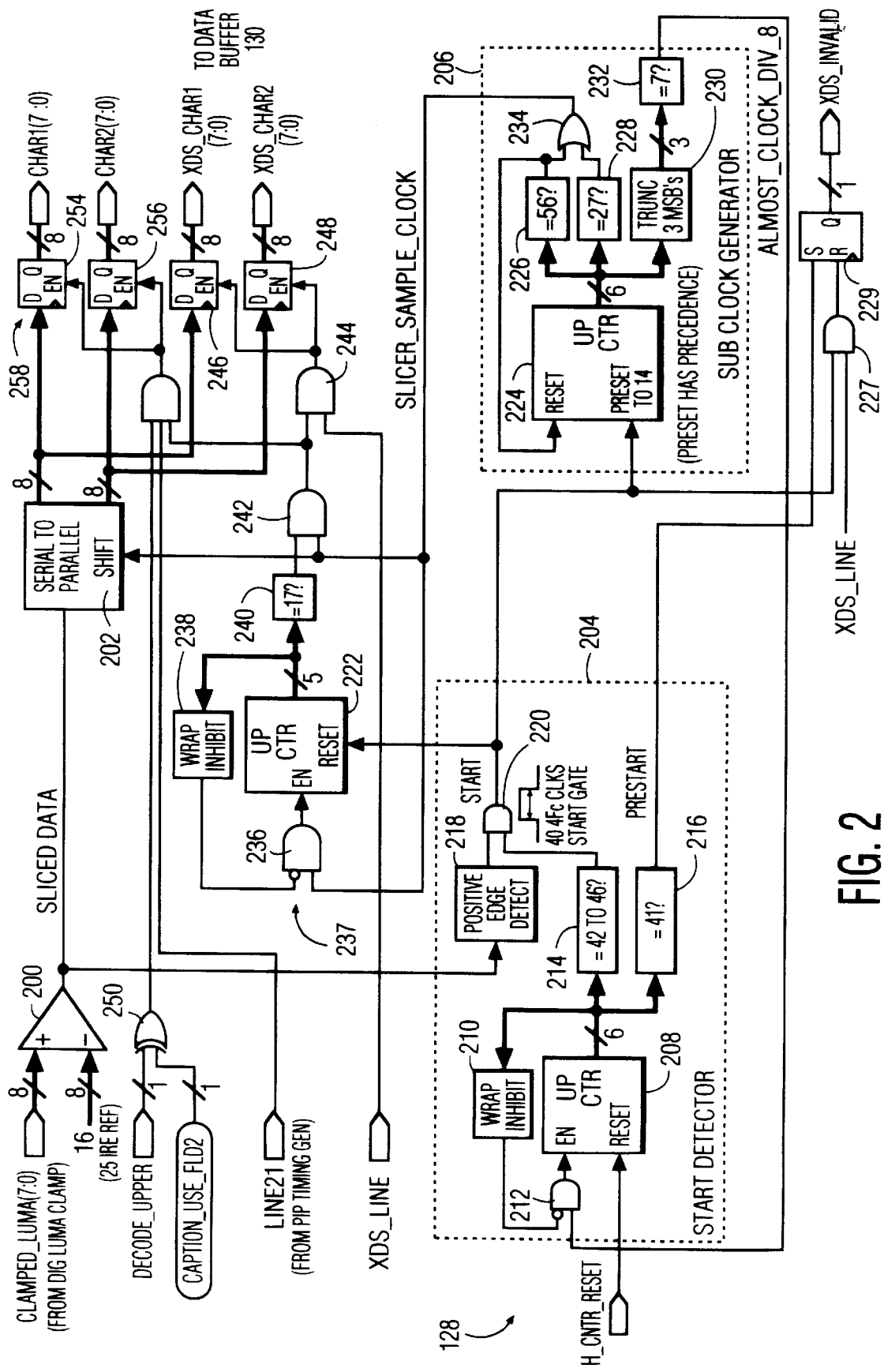
FIG. 2 depicts a block diagram of an embodiment of a first portion of a secondary auxiliary data decoder comprising a data slicer arranged in accordance with features described herein.

FIG. 2 depicts a block diagram of a data slicer included in secondary auxiliary data processor 143 in FIG. 1. The data slicer contains a comparator 200, a serial-to-parallel converter 202, a start detector 204, a sub-clock generator 206, parallel data buffer 258, and 25 buffer timing generator 237. The data slicer converts a signal CLAMPED-LUMA into a sequence of 8-bit words representing the auxiliary data carried by the video signal. Signal CLAMPED-LUMA is a luminance signal (Y) that is separated from a secondary composite video signal such as signal VIDEO IN in FIG. 1. PIP unit 140 in FIG. 1 separates the luma component from the secondary composite video signal using conventional comb filtering (not shown in FIG. 1).

The data slicer extracts two (one byte) characters per field from the auxiliary data signal in the VBI of pre-defined lines of the NTSC television signal, e.g., these particular lines each contain an auxiliary data character pair. These characters include CHAR-1 and CHAR-2 words of closed caption information or XDS_CHAR1 and XDS_CHAR2 words of EXtended Data Services information. The CHAR1 and CHAR2 words are decoded and converted into a PIP caption display as described in the above-mentioned U.S. patent application Ser. No. 770,770 (Attorney Docket No. RCA 88,200) entitled "METHOD AND APPARATUS FOR POSITIONING AUXILIARY INFORMATION PROXIMATE AN AUXILIARY IMAGE IN A MULTI-IMAGE DISPLAY". XDS_CHAR1 and XDS_CHAR2 words are provided to the data buffer shown in FIG. 3 and described in detail below. As described in regard to FIG. 3, the data buffer temporarily stores extracted data until the data can be communicated via I²C BUS to main microprocessor 110 for further processing such as monitoring of PIP-related V-chip data. The XDS_LINE signal in FIG. 2 is high during each line of the television signal selected for recovering XDS data (which is software selectable for lines 7 through 22).

In FIG. 2, comparator 200 compares the video signal (CLAMPED-LUMA) to a reference level, e.g., 25 IRE, to convert the video signal carrying the auxiliary data into a binary signal SLICED_DATA that exhibits a serial data stream. Signal SLICED_DATA is coupled to a serial-to-parallel converter 202 for converting the serial data stream into parallel binary words. Signal SLICED DATA also synchronizes system timing via the start detector 204 and the sub-clock generator 206.

The start detector 204 establishes a window interval during which a start pulse that is included in the encoded signal is expected to occur. A start pulse occurring during the window interval is used to reset the serial-to-parallel conversion process and to reset the sub-clock generator 206. More specifically, the start detector includes a counter 25 208, a wrap inhibit circuit 210, an AND gate 212, a first count comparator 214, a second count comparator 216, a positive edge detector 218 and an AND gate 220. The counter 208 up counts at a nominal rate of 1.875 MHz in response to a clock signal (ALMOST_CLOCK_DIV_8) that is generated by the sub-clock generator 206. The counter reset signal (H_CNTR_RESET) resets the counter once per horizontal line. The wrap inhibit circuit 210 is coupled to an inverting input of AND gate 212 to ensure that counter will not rollover or wrap.

The output of counter 208 is coupled to the input of count comparator 214 and count comparator 216. Count comparator 216 compares the output of the counter to a count value, in this case, 41 at which time the output of the comparator transitions upon the counter attaining the value of 41. As such, this generates a pre-start signal that indicates that the window of opportunity for receiving the auxiliary data is about to occur. This pre-start signal also forms the XDS data invalid signal (XDS_INVALID) that is reset if a valid data start signal is received. If the data start signal is not received, the pre-start signal remains high to indicate that the data that is generated by the slicer for this field is inaccurate.

Comparator 214 compares the output of the counter to threshold values of 42 and 46. This comparison generates a window of opportunity (a so-called start gate) for the data start signal to occur within a horizontal line. This window is coupled to one input of AND gate 220. The signal SLICED DATA is coupled to positive edge detector 218 wherein, when a positive edge is detected, the output of the detector becomes high. The output of the positive edge detector 218 is coupled to a second input of AND gate 220. The output of AND gate 220 is the START signal. The START signal is only high when the positive edge detector transitions during the start gate generated by comparator 214, e.g., a valid start signal is only generated during the VBI of in lines 7 through 22.

The output of AND gate 220 is coupled to the RESET terminal of counter 222, coupled to PRESET terminal of counter 224 and coupled to one input of AND gate 226. The XDS_LINE signal is coupled to a second input of AND gate 226 such that the output of the gate transitions when the START signal transitions high and the XDS_LINE signal is also high. The XDS_LINE signal identifies each line that is supposed to contain valid XDS data, e.g., the signal is high during the VBI of line 21, and, possibly each of lines 7 through 22. Consequently, the R (reset)terminal of SR flip-flop 228 transitions high and resets the flip-flop. This resets the XDS_INVALID signal when a start pulse occurs within the appropriate line number or range of line numbers.

Sub-clock generator 206 contains counter 224, count comparators, 226, 228, and 232, and truncation circuit 230. The sub-clock generator is used to generate the slicer sample clock signal that clocks the data words through the serial-to-parallel converter as well as a sub-clock signal (ALMOST_CLOCK_DIV_8) that is coupled to the start detector 204. Each slicer sample clock pulse shifts one bit of the 8-bit words of serial data through the serial-to-parallel converter.

More specifically, counter 224 is preset with the value 14 when the START signal occurs. Thereafter, the counter increments at a nominal rate of approximately 14.318 MHz. When the counter 224 attains a value of 27. The comparator 228 allows clock pulses to pass to one input of OR gate 234. When the counter attains a value of 56, the output of comparator 226 transitions and resets the counter to zero to await the next START pulse. The output of comparator 226 is coupled to the second input of OR gate 234. As such, the clock signal exists for 28.5 cycles of the master clock as defined by comparators 228 and 226. The average period of the clock signal is 1995 ns (e.g., 28.5 cycles of the 70 ns master clock). The sample clock pulses during this period are one master clock cycle (e.g., 70 ns) wide and are synchronized to occur in the center of each data bit.

The output of the counter 224 is further coupled to the input of the truncation circuit 230 that truncates the three most significant bits (MSB) from the count value and then compares that truncated value to a count threshold of 7 using count comparator 232. Consequently, the counter value is divided by 8, e.g., a pulse is generated every 8 counts of counter 224. This signal (ALMOST_CLOCK_DIV_8) is coupled to one input of the AND gate 212 within the start detector 204. Thus, counter 208 counts at approximately 1.875 MHz, e.g., counter 224 clock rate divided by 8.

The slicer sample clock signal is coupled to the shift terminal of the serial-to-parallel converter 202 as well as to one input of AND gate 236. The parallel data from converter 202 is passed to the parallel data buffer 258. This buffer contains four D flip flops 254, 256, 246 and 248 that temporarily store the parallel auxiliary data. The buffer timing generator 237 controls when the parallel data is clocked out of the parallel buffer 258.

The buffer timing generator 237 contains a counter 222, AND gates 236, 242, 244 and 252, count comparator 240, and a wrap inhibit circuit 238. This generator produces a pulse that clocks data from the buffer 258 after the data is available from converter 202. Counter 222 is reset by the START signal and then counts up from there with each SLICER_SAMPLE_CLOCK pulse which enables the counter 222. Additionally, the output of the counter 222 is coupled to a count comparator 240 that compares the counter count value to the value 17. Thus, when the counter value equals 17, the comparator transitions. The output of the comparator 240 is coupled to one input of AND gate 242. The second input of AND gate 242 is coupled to the SLICER_SAMPLE_CLOCK signal. The output of AND gate 242 is coupled to one input of AND gate 244. The second input of AND gate 244 is coupled to the XDS_LINE signal. AND gate 244 validates that the data is XDS data, e.g., data from an XDS data carrying line. The output of gate 244 is coupled to the enable terminals of the flip-flops 246 and 248. The parallel data from the serial-to-parallel converter 202 is coupled to the D inputs of the 8-bit wide flip-flops 246 and 248. Thus, upon the output of gate 244 transitioning, the XDS data is clocked through the flip flops to data buffer 130.

Furthermore, a decode upper signal is coupled to a first input of exclusive OR gate 250 and a second input of exclusive OR gate 250 is coupled to a CAPTION_USE_FLD2 signal. These signals define which field (e.g., field 1 or field 2) carries the closed caption data. The output of the exclusive OR gate 250 is coupled to AND gate 252. A second input to AND gate 252 is coupled to a LINE21 signal and a third input to gate 252 is coupled to the output of gate 242. As a result, the output of gate 252 transitions when the closed caption data from line 21 has been converted and is ready for output from flip-flops 254 and 256. As such, the output of gate 252 is coupled to the enable ports of D flip-flops 254 and 256. The D flip-flops have as inputs the 8-bit wide parallel data from serial-to-parallel converter 202. Consequently, the serial-to-parallel converter converts the sliced serial data from comparator 200 into parallel words and those words are clocked at an appropriate time into the 8-bit wide D flip-flops. For the closed captioned characters 1 and 2, the D flip-flops are enabled at line 21 during the field that carries the closed caption data. For the auxiliary data that is carried by XDS_CHAR1 and XDS_CHAR2 signals, the parallel data is clocked into the D flip-flops during a preset line number or line numbers defined by the XDS_LINE signal.

The data slicer also provides an indicator of a missing start pulse (which would imply invalid data at the output of the data slicer). XDS_INVALID is set immediately prior to the window of opportunity for each fields start pulse. It is quickly cleared by gate 226 and flip-flop 228 if a valid start pulse is detected within a line selected for XDS data decoding.

Figure 3:
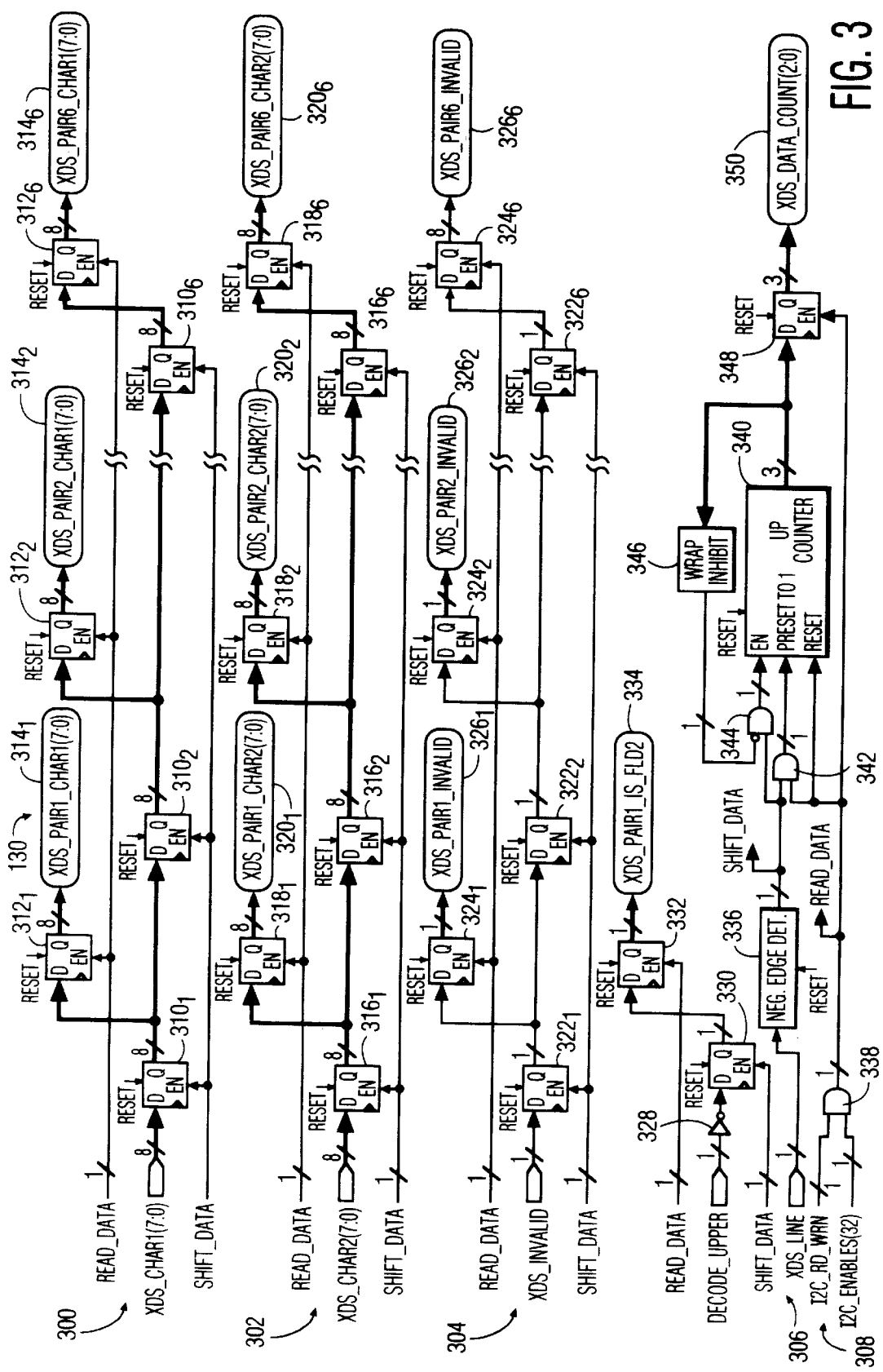
FIG. 3 depicts a block diagram of an embodiment of a second portion of an auxiliary data decoder comprising an auxiliary data buffer for coupling data from the data slicer shown in FIG. 2 to a serial bus.

The data buffer unit shown in FIG. 3 includes twenty adjacent I$^2$C bus registers. The first two registers 334 and 350 contain status information, the next six registers $326_1$ to $326_6$ contain validity data, the remaining twelve registers $314_1$ to $314_6$ and $320_1$ to $320_6$ contain sliced data from the data slicer. The data buffer unit comprises five separate circuits. Specifically, there are three data buffers 300, 302, and 304, a data reference circuit 306 and a control circuit 308. The data buffers operate as first-in, first-out memory units and include an XDS_CHAR1 buffer 300, an XDS_CHAR2 buffer 302 and an XDS_INVALID buffer 304. The XDS_CHAR1 buffer includes six, serially connected 8-bit wide D flip-flops $310_1$ through $310_6$. Additionally, the XDS_CHAR1 buffer 300 contains output buffers which are 8-bit wide D flip-flops $312_1$ through $312_6$ and six serial bus registers $314_1$ through $314_6$. Each of the output D flip flops have their D input terminals connected to a respective output of a D flip-flop $310_1$ through $310_6$. As such, the buffer retains six characters before the buffer will overflow, i.e., the buffer has a depth of six words. The buffer operates asynchronously from the central processing unit of the television receiver such that the CPU will poll, at intermittent times, the registers within the buffer via a serial bus, (e.g., the I$^2$C bus). As such, the buffer must store a plurality of XDS data characters while awaiting the CPU to poll the registers via the I$^2$C bus.

A plurality of I$^2$C registers are used to store the information that is to be passed to the I$^2$C bus. Upon the occurrence of each line in a field that contains the XDS data information, the signal SHIFT_DATA enables the 8-bit wide, D flip-flops $310_1$ through $310_6$ to shift the 8-bit data to the right through the memory. As such, six fields that carry XDS data can occur before the buffer is full and will overflow. Assuming, of course, that only one line in each field carries XDS data. If more than one line in a field carries XDS data, then the buffer stores less than six fields worth of data. If XDS data is available once per field, a SHIFT_DATA signal occurs once every field, thus the data is shifted once every 60th of a second. Note that XDS data generally appears in field 2 only (e.g., every other field); thus, the XDS data in every other register may be invalid and, as such, would not be used by the microprocessor. Consequently, at least once every 10th of a second the CPU must read the data from the buffer or some data will be lost. The CPU enables the READ_DATA signal to enable the flip-flops $312_1$ to $312_6$ to clock the data from the input of the D flip-flops into the I$^2$C bus registers associated with each of the D flip-flops. These registers are number $314_1$ through $314_6$. The CPU then reads the data from the bus registers at a later time.

In a similar manner, the XDS_CHAR2 is buffered in buffer 302 having D flip-flops $316_1$ through $316_6$ operating as a first-in, first-out memory. Additionally, the output D flip-flops are $318_1$ through $318_6$ that, at the appropriate time, clock the data within the buffer flip flops $316_1$ through $316_6$. I$^2$C bus registers $320_1$ through $320_6$.

Furthermore, the XDS_INVALID signal that indicates that a start signal was not received at an appropriate time during a line that should carry XDS data is coupled into a buffer 304. This buffer has similar form to the XDS_CHAR buffer in that it operates as a first-in, first-out, memory unit. As such, the XDS_INVALID buffer 304 contains a plurality of series connected D flip-flops $322_1$ through $322_6$ that clock the data through the buffer in a first-in, first-out fashion. Additionally, the XDS_INVALID signal is clocked, at an appropriate time, into the output registers $326_1$ through $326_6$ via the output D flip-flops $324_1$ through $324_6$ that are respectively connected to each of the flip flops $322_1$ through $322_6$.

Under the V-Chip functionality standard, the data that identifies the program rating or content is always located in field 2 of a frame, i.e., a frame comprises field 1 and field 2. However, because the data is clocked into the buffers in an asynchronous fashion, the data from field 2 is not clearly indicated. As such, a reference to field 2 data is required. Circuit 306 provides such a reference. The DECODE_UPPER signal is an indicator of the upper field or field 2 information. As such, when field 2 is about to be received, the DECODE_UPPER signal transitions high. This signal is inverted via an inverter 328. The inverted signal value is coupled to the input of D flip-flop 330. The D flip-flop is enabled by the SHIFT_DATA signal such that the output is clocked through the flip-flop. Specifically, when the SHIFT_DATA signal occurs, the output of D flip-flop 330 is coupled to the D input of D flip-flop 332. This D flip-flop is enabled by the READ_DATA signal that then couples the input of the D flip-flop 332 into a serial bus register 334. The register value indicates the first XDS data value pair of the six pairs stored in the buffer that is from field one.

Control circuit 308 produces the READ_DATA and SHIFT_DATA signals. The READ_DATA signal is formed in response to an enable signal generated by the CPU within the television receiver, while the XDS_LINE signal is used to form the SHIFT_DATA signal. The XDS_LINE signal is coupled to a negative edge detector 336 which will transition its output on the negative edge of the XDS_LINE signal, e.g., after a line carrying XDS data has occurred. This signal becomes the SHIFT_DATA signal such that at the end of the XDS data carrying line, the XDS data is shifted through the buffer.

When reading data from the buffer, main μP 110 generates the required data read signals which are communicated to processor 140 via the I$^2$C BUS. In response to the data read signals, processor 140 generates signals I$^2$C_RD_WRN and I$^2$C_ENABLES_(32) which are coupled to respective inputs of AND gate 338. The output of the AND gate is the READ_DATA signal. As such, the CPU sends the enable signals whenever the data is to be latched into the serial bus registers. The READ_DATA signal is further coupled to the RESET terminal of a counter 340 as well as one input of AND gate 342. The second input of AND gate 342 is coupled to the SHIFT_DATA signal. The output of AND gate 342 is coupled to the preset to 1 input port of the counter 340. The SHIFT_DATA signal is also coupled to one input of AND gate 344 and the inverted input into an AND gate 334 is provided from a wrap inhibit circuit 346 that prevents the counter from rolling over. The output of the counter forms an input to a D flip-flop 348 which has its data clocked through the flip-flop upon each occurrence of the READ_DATA signal. As such, the counter value is stored in an XDS data count register 350 (XDS_DATA_COUNT (210)) of the serial bus. This register contains a count value that indicates how many data shifts have occurred since the last time the CPU read the serial bus registers. Since the CPU asynchronously reads the data, there may be occurrences where some of the data remaining in the buffer has previously been read by the CPU. The count value will indicate how many shifts have occurred such that the CPU can ignore the data that was previously read.

XDS_PAIR1 register always contains the newest data, and XDS_PAIR6 register the oldest. For example, where XDS_DATA_COUNT is four, XDS_PAIR1 through XDS_PAIR4 must be read, and XDS_PAIR5 and XDS_PAIR6 are ignored. To prevent overflow, the interval between initiating reads is generally less than 100.09 msec (3 frames).

By using this auxiliary data stream, it is possible to monitor V-Chip rating and program content information for both main & PIP signals simultaneously. It is possible, therefore, for the system to modify one picture independently of the other in response to program content information, e.g., blank the large picture while the small picture continues to display television programming. This independent picture modification capability is described in detail in above-mentioned U.S. patent application Ser. No. 769,333 (Attorney Docket No. RCA 88,461) entitled "VIDEO SIGNAL PROCESSING SYSTEM PROVIDING INDEPENDENT IMAGE MODIFICATION IN A MULTI_IMAGE DISPLAY."

The auxiliary data stream also makes it possible to accumulate StarSight® program guide information any time PIP operation is disabled without conflicting with captioning, content advisory, caption on mute or XDS for the main picture. The source of the auxiliary signal may be a second tuner or an external signal for simultaneous utilization of V-chip information. To accumulate StarSight® program guide information during normal viewing of antenna-based signals requires a second tuner. As such, the second tuner provides the XDS data to generate the program guide, while the primary tuner is used to view current programming. Consequently, the StarSight® program guide is produced in the background without interfering with the main picture viewing.

Although various embodiments which incorporate the teachings of the present invention have been shown and described in detail herein, those skilled in the art can readily devise many other varied embodiments that still incorporate those teachings. In particular, in addition to the picture-in-picture video systems described herein, the invention is also applicable to other multi-image video signal processing systems such as picture-outside-picture (POP) systems.

What is claimed is:

1. Television apparatus comprising:
   a first decoder for decoding first auxiliary information included in a first television signal for determining rating content of television programming included in said first television signal; and
   a second decoder for decoding second auxiliary information included in a second television signal for determining rating content of television programming included in said second television signal.

2. The television receiver of claim 1 further comprising:
   means responsive to said first and second television signals for producing an output signal representing a video image having a first image region representing video information included in said first television signal and having a second image region representing video information included in said second television signal.

3. The television receiver of claim 2 further comprising a controller for controlling functions of said television receiver and a serial data bus for transferring data serially according to an $I^2C$ protocol between said controller and said means for producing said output signal; wherein said second decoder produces binary data representative of said second auxiliary information; said means for producing said output signal comprises a buffer for storing said binary data; said data being transferred from said buffer to said controller via said serial data bus.

4. Television apparatus comprising:
   means responsive to first and second television signals for producing an output signal representing a video image having a first image region representing video information included in said first television signal and having a second image region representing video information included in said second television signal;
   a first decoder for decoding first auxiliary information included in said first television signal for determining rating content of television programming included in said first television signal; and
   a second decoder for decoding second auxiliary information included in said second television signal for determining rating content of television programming included in said second television signal.

5. The television apparatus of claim 4 further comprising a data buffer, coupled to an output of said second decoder, for buffering said second auxiliary information.

6. The television apparatus of claim 5 wherein said data buffer further comprises:
   a first character buffer;
   a second character buffer;
   a character reference circuit; and
   a control circuit, coupled to said first character buffer, said second character buffer and said character reference circuit.

7. Television apparatus comprising:
   means responsive to first and second television signals for producing an output signal representing a video image having a first image region representing video information included in said first television signal and having a second image region representing video information included in said second television signal;
   a first decoder for decoding first auxiliary information included in said first television signal for determining rating content of television programming included in said first television signal;

a second decoder for decoding second auxiliary information included in said second television signal for determining rating content of television programming included in said second television signal;

a data buffer, coupled to an output of said second decoder, for buffering said second auxiliary information, said data buffer having a first character buffer, a second character buffer, a character reference circuit, a control circuit, coupled to said first character buffer, said second character buffer and said character reference circuit and an invalid data buffer for buffering an invalid data signal that identifies second auxiliary data within said first and second character buffers that is invalid.

8. The television apparatus of claim 7 wherein said first and second character buffers and said invalid data buffer each comprise:

a plurality of series connected buffer flip flops arranged as a first in, first out memory;

a plurality of output flip flops, where each input terminal of each output flip-flop is coupled to a respective output terminal of each of said buffer flip-flops in said plurality of series connected buffer flip-flops; and a plurality of serial bus registers coupled to an output terminal of each of said output flip-flops.

9. The television apparatus of claim 8 wherein said control circuit comprises:

a first control signal generator for generating a shift signal for each horizontal line within said second television signal that contains second auxiliary data, where said shift signal indicates an end of each such horizontal line, said shift signal is coupled to said first character buffer, said second character buffer, and said invalid data buffer; and a second control signal generator for generating a read signal in response to a microprocessor requesting the second auxiliary data, said read signal is coupled to said first character buffer, said second character buffer, and said invalid data buffer.

10. A television receiver comprising:

a video signal processor for processing first and second television signals for producing an output signal representing a video image having a first image region representing video information included in said first television signal and having a second image region representing video information included in said second television signal;

a controller for controlling operation of said television receiver; and an $I^2C$ serial data bus for communicating data between said controller and said video signal processor; wherein said controller comprises a first decoder for decoding first auxiliary information included in a first television signal to produce first binary data indicating a first rating content of television programming included in said first television signal;

said video signal processor comprises a second decoder for decoding second auxiliary information included in a second television signal to produce second binary data indicating a second rating content of television programming included in said second television signal, and a data buffer for buffering said second binary data;

said second binary data being communicated from said buffer to said controller via said serial data bus.

11. The receiver of claim 10 wherein said data buffer further comprises:

a first character buffer;

a second character buffer;

a character reference circuit; and a control circuit, coupled to said first character buffer, said second character buffer and said character reference circuit.

12. A television receiver comprising:

a video signal processor for processing first and second television signals for producing an output signal representing a video image having a first image region representing video information included in said first television signal and having a second image region representing video information included in said second television signal;

a controller for controlling operation of said television receiver;

an $I^2C$ serial data bus for communicating data between said controller and said video signal processor; wherein said controller comprises a first decoder for decoding first auxiliary information included in a first television signal to produce first binary data indicating a first rating content of television programming included in said first television signal;

said video signal processor comprises a second decoder for decoding second auxiliary information included in a second television signal to produce second binary data indicating a second rating content of television programming included in said second television signal, and a data buffer for buffering said second binary data; and said second binary data being communicated from said buffer to said controller via said serial data bus, said buffer having a first character buffer, a second character buffer, a character reference circuit, a control circuit, coupled to said first character buffer, said second character buffer and said character reference circuit and an invalid data buffer for buffering an invalid data signal that identifies second auxiliary data within said first and second character buffers that is invalid.

13. The receiver of claim 12 wherein said first and second character buffers and said invalid data buffer each comprise:

a plurality of series connected buffer flip flops arranged as a first in, first out memory;

a plurality of output flip flops, where each input terminal of each output flip-flop is coupled to a respective output terminal of each of said buffer flip-flops in said plurality of series connected buffer flip-flops; and a plurality of serial bus registers coupled to an output terminal of each of said output flip-flops.

14. The receiver of claim 13 wherein said control circuit comprises:

a first control signal generator for generating a shift signal for each horizontal line within said second television signal that contains second auxiliary data, where said shift signal indicates an end of each such horizontal line, said shift signal is coupled to said first character buffer, said second character buffer, and said invalid data buffer; and a second control signal generator for generating a read signal in response to a microprocessor requesting the second auxiliary data, said read signal is coupled to said first character buffer, said second character buffer, and said invalid data buffer.

* * * * *